United States Patent
Comer et al.

(10) Patent No.: US 6,316,114 B1
(45) Date of Patent: *Nov. 13, 2001

(54) BARRIER FILMS BASED ON BLENDS OF POLYPROPYLENE AND ETHYLENE-VINYL ALCOHOL COPOLYMER

(75) Inventors: Annette Marie Comer, Alleghany County, VA (US); Mark Thomas DeMeuse, Hockessin, DE (US)

(73) Assignee: Applied Extrusion Technologies, Inc., Peabody, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/726,987

(22) Filed: Oct. 7, 1996

(51) Int. Cl.[7] .................................................. B32B 27/00
(52) U.S. Cl. ....................... 428/461; 428/411.1; 428/447; 428/451; 428/457; 428/463; 428/500; 428/515; 428/516; 428/518; 428/523; 525/56; 525/57
(58) Field of Search .................. 525/57, 56; 428/411.1, 428/447, 451, 457, 461, 463, 500, 515, 516, 518, 523

(56) References Cited

U.S. PATENT DOCUMENTS

| | | | |
|---|---|---|---|
| 3,173,163 | * 3/1965 | Cramton | 15/159 |
| 3,666,834 | * 5/1972 | Bullard | 260/897 A |
| 3,857,754 | * 12/1974 | Hirata et al. | 161/227 |
| 4,261,473 | * 4/1981 | Yamada et al. | 428/412 |
| 4,365,044 | * 12/1982 | Liu | 525/240 |
| 4,561,920 | 12/1985 | Foster | 156/244.11 |
| 4,610,914 | * 9/1986 | Newsome | 525/75 |
| 4,621,014 | 11/1986 | Lu | 428/216 |
| 4,650,721 | 3/1987 | Ashcraft et al. | 428/516 |
| 4,673,711 | * 6/1987 | Sharps, Jr. et al. | 525/240 |
| 4,726,984 | 2/1988 | Shah | 428/216 |
| 4,879,078 | * 11/1989 | Antoon, Jr. | 264/41 |
| 4,880,697 | 11/1989 | Caldwell et al. | 428/35.4 |
| 4,880,706 | 11/1989 | Mazuera et al. | 428/216 |
| 4,923,703 | * 5/1990 | Antoon, Jr. | 426/118 |
| 5,024,897 | * 6/1991 | Mason et al. | 525/57 |
| 5,084,352 | 1/1992 | Percec et al. | 428/212 |
| 5,192,620 | 3/1993 | Chu | 428/461 |
| 5,274,030 | * 12/1993 | Audry et al. | 525/57 |
| 5,278,229 | * 1/1994 | Asano et al. | 525/57 |
| 5,280,065 | * 1/1994 | Moriyama et al. | 525/57 |
| 5,338,502 | * 8/1994 | Moriyama et al. | 264/322 |
| 5,393,832 | 2/1995 | Moulies et al. | 525/57 |
| 5,424,362 | * 6/1995 | Hwang et al. | 525/57 |
| 5,456,979 | * 10/1995 | Schirmer | 428/336 |
| 5,506,297 | * 4/1996 | Uehara et al. | 525/57 |
| 5,674,608 | * 10/1997 | Schirmer | 428/336 |

* cited by examiner

*Primary Examiner*—Judy M. Reddick
(74) *Attorney, Agent, or Firm*—Caesar, Rivise, Bernstein, Cohen & Pokotilow, Ltd.

(57) ABSTRACT

Oriented films of polypropylene and ethylene-vinyl alcohol copolymer are disclosed wherein the ethylene content of the copolymer is from about 40 to 50 mole %. The films are characterized by an improved oxygen transmission rate. Films are readily drawn to 6× by 6×. Films also exhibit improved resistance to transmission helium gas.

10 Claims, No Drawings

BARRIER FILMS BASED ON BLENDS OF POLYPROPYLENE AND ETHYLENE-VINYL ALCOHOL COPOLYMER

This invention relates to biaxially oriented films comprised of polypropylene, which films exhibit improved oxygen transmission properties as compared to films of polypropylene presently known to the art. More specifically, it relates to such films that are comprised of a specific, substantially homogeneous blend of polypropylene and a copolymer of ethylene and vinyl alcohol.

BACKGROUND INFORMATION

Polyolefin films, and, in particular, polypropylene films, have become a dominant factor in the packaging film industry in recent years, thanks to a spectrum of favorable properties. However, the realization of the full potential of these films as packaging materials has been hampered by their lack of good resistance to the transmission of oxygen.

A very desirable approach to improving the oxygen and also the moisture vapor transmission rate of polypropylene films is the application of a metal, usually aluminum, coating to one or both surfaces of the film. Many journal articles and patents have been published relating to the application of metal barrier coatings and metal coating is widely practiced in the film industry at the present time. Metal coating is, however, a relatively costly technique as it involves extra surface preparation steps and costly application apparatus and processes.

It is also known to prepare films and containers of polypropylene using composite structures comprised of polypropylene layered with another material having better oxygen transmission properties, e.g. polyvinyl or polyvinylidene chloride, vinyl acrylate/acrylonitrile copolymer or a vinyl alcohol polymer or copolymer. Further, it is known to prepare films having good oxygen transmission properties in which small, discrete particles of polypropylene are dispersed throughout a vinyl alcohol polymer matrix.

BRIEF STATEMENT OF THE INVENTION

In accordance with this invention it has been found that oriented films comprised of a blend of polypropylene and a copolymer of ethylene and vinyl alcohol exhibit excellent resistance to the transmission of oxygen without the application of a metal coating. Specifically stated, the invention is an oriented film comprised of a substantially homogeneous blend of polypropylene and up to about 40% by weight, based on the total weight of the blend, of a copolymer of ethylene and vinyl alcohol. In a preferred embodiment of the invention, the ethylene-vinyl alcohol copolymer comprises about 3 to 30% by weight of the substantially homogeneous blend and in a most preferred embodiment, about 10 to 25%.

Several embodiments of the invention are contemplated. In a first embodiment, the films of the invention can exist as stand-alone films of the blend of polypropylene and ethylene-vinyl alcohol copolymer. These can be mono-layer structures or they can be composite (multilayer) structures wherein the inventive film serves as a core having one or more functional layers on at least one of its surfaces.

The invention also contemplates an oriented composite film comprised of a polypropylene core layer having, on one or both of its surfaces, as a barrier layer, a film comprised of the substantially homogeneous blend of polypropylene and an ethylene-vinyl alcohol copolymer as described hereinabove.

In a preferred embodiment of the invention, the film is an oriented composite film comprised of a polypropylene core having on one of its surfaces a substantially homogeneous blend of polypropylene and an ethylene-vinyl alcohol copolymer and, on the other surface, a sealable coating.

DETAILED DESCRIPTION OF THE INVENTION

When reference is made herein to polypropylene, it is intended to indicate a highly crystalline (isotactic) propylene homopolymer or a copolymer of propylene with another olefin or α-olefin having about 2 to 5 carbons in an amount insufficient to have a significant effect on the crystallinity of the polypropylene. Typically, this is ethylene in an amount less than about 2%.

References to a "substantially homogeneous" blend of polypropylene and ethylene-vinyl alcohol copolymer are intended to refer to a mixture of the two components that has been melt blended so that each component exists as a continuous phase with the other as opposed to one of the components existing in a dispersed phase.

The present invention is based on the finding that certain ethylene-vinyl alcohol (EVOH) copolymers, within specified concentration limits, can form substantially homogeneous blends with polypropylene and such blends can be employed to form biaxially oriented films having good oxygen barrier properties. Typically, these films exhibit oxygen transmission rates, measured according to ASTM D3985-81, less than about 30 cm$^3$/100 in$^2$/atm/day and frequently less than about 15 cm$^3$/100 in$^2$/atm/day. This compares to an oxygen transmission rate on the order of about 150 cm$^3$/100 in$^2$/atm/day for polypropylene that has not been treated or modified to improve its oxygen barrier properties.

Films comprised of substantially homogeneous blends of an ethylene-vinyl alcohol copolymer and polypropylene according to this invention possess a significant advantage over packaging films previously known to the art in that they have high resistance to oxygen transmission without the application of metal or other barrier coating materials. Thus, costly metal application steps can be eliminated along with the costly surface preparation steps required to make the film surface receptive to the coating metal.

The films prepared from blends of polypropylene and an ethylene-vinyl alcohol copolymer according to this invention can be stand-alone, self-supporting films or they can be thin films applied as barrier layers on a polypropylene core. When the films are employed in the stand-alone embodiment, the additional expense of preparing a composite film is, of course, avoided as well as the expense involved in the application of a metal or other barrier material. Alternatively, a stand-alone film according to the invention can serve as the core layer of a composite structure having a functional layer applied to either or both of its surfaces. Suitable functional layers that can be applied include, by way of example, a heat or cold seal layer, a slip layer, a printable layer or a layer that combines two or more of such functions. Further, the second layer can be a layer suitable for lamination with yet another layer or material.

On the other hand, when the film is employed as a barrier layer on a polypropylene core, excellent barrier properties are realized with a smaller amount of the more expensive copolymer component. When employed as barrier coatings on a polypropylene core, these films exhibit an additional advantage over many other known barrier coating materials in that, due to the polypropylene content of the blends, they adhere directly to the polypropylene core without the need for an intermediate tie layer.

The ethylene-vinyl alcohol copolymer employed in this invention can contain about 40 to 50 mole % of the ethylene component. Preferably, it contains about 44 to 48 mole % ethylene. Preferred copolymers are commercially available under the Trade name "EVAL" from The Eval Company of America, Lisle, Ill. (Evalca).

The blends of ethylene-vinyl alcohol copolymer and polypropylene employed in the films of this invention can contain up to about 40% by weight of the copolymer, based on the total weight of the blend. Preferably, the copolymer is present in an amount of about 3 to 30%, and most preferably about 10 to 25%. When the blend is intended for use as a stand-alone film rather than as a layer applied onto a composite film, the amount of the copolymer in the blend will be on the lower end of the specified range, i.e, about 3 to 20%.

When the film of a blend of polypropylene and ethylene-vinyl alcohol copolymer according to the invention is applied as a barrier layer on a polypropylene core, the film can double as a functional layer for other purposes. For example, this layer can also serve as a receiving layer for decorative coatings, printed matter, or as a layer for receiving an adhesive coating.

The films according to the invention can also be provided with a metal or metal oxide coating either for decorative purposes or for additional improvement of the oxygen barrier properties. Good materials for providing barrier improvement include silicon oxides, silicon oxide/aluminum mixtures, aluminum, aluminum oxide, zinc, copper and copper alloys such as bronze, as well as gold and silver. Mixtures of any of these materials can also be employed. Aluminum is a preferred barrier coating material.

The metal or metal oxide coatings can be applied by a variety of known techniques. Suitable such techniques include sputtering, vacuum vapor deposition, plasma treatment and electroplating. Of these, vacuum vapor deposition is preferred and is most commonly employed.

It is found that the films of the invention, when so coated, exhibit significantly better oxygen barrier than other known metal coated polypropylene films. When films according to the invention are metal coated, they frequently exhibit oxygen transmission rates less than one $cm^3/100$ $in^2/atm/$day.

Another useful and unexpected characteristic of the films according to the invention is their good helium barrier properties. Either plain or metal coated, these films are significantly superior to the corresponding product prepared from polypropylene. Thus, the helium transmission rate (HeTR) of the films according to the invention after metal coating is on the order of about 25 to 50 $cm^3/100$ $in^2/atm/$day. This compares to HeTR of about 180–200 $cm^3/100$ $in^2/atm/day$ for conventional metallized polypropylene films.

The film of the copolymer/polypropylene blend can be applied to one or both surfaces of the polypropylene core. If the blend is applied to only one surface of the polypropylene core, the other surface can be uncoated or it can have another functional layer applied thereto. Suitable functional layers include those mentioned hereinabove.

As stated above, the preferred polyolefin for use in the core layer of the composite film embodiment of the invention is an isotactic homopolymer of propylene. Suitable polypropylenes are the commercially available isotactic polypropylenes having a melt flow rate between about 2 and 10 dg/min and a DSC melting point of about 160 to 166° C. One polypropylene that can be used is the highly isotactic homopolymer having a melt flow rate of about 3.5 dg/min available from Aristech Chemical Corporation, Pittsburgh, Pa. Suitable polypropylenes are also available from Montell, Inc. Wilmington, Del. and from Exxon Chemical Company, Baytown, Tex.

The polypropylene employed in the blend of polypropylene and ethylene-vinyl alcohol copolymer is an isotactic propylene homopolymer. When the blend of polypropylene and ethylene-vinyl alcohol copolymer is employed as a surface layer of a composite film, the polypropylene employed in the blend need not be the same as that employed in the core. However, it is preferred that it be the same.

If another functional layer is included in addition to the film containing the ethylene-vinyl alcohol copolymer, the materials employed in that other layer will be dictated by the function intended for that layer. Thus, the additional layer need not contain any polypropylene at all. If this layer is intended to be a heat seal layer, it can be a layer of, e.g., polyvinyl or polyvinylidene chloride or a polyolefin of a lower melting point than that of the polypropylene employed as the core layer. The lower melting polyolefin can be, e.g., an ethylene-propylene copolymer having an ethylene content sufficient to lower the melting point to a temperature such that the film can be heat sealed without melting or deorienting the core. A terpolymer of ethylene, propylene and butene-1 is also suitable as the heat sealable layer. If the additional layer is polyvinyl or polyvinylidene chloride heat seal layer, it will also further increase the barrier properties of the film. If the layer is to be a slip layer, it can be composed of the same polymer as is used in the core, but into which the appropriate additives, e.g. unsaturated primary aliphatic amides or other known slip additives have been incorporated.

Other conventional additives, in conventional amounts, can be included in the films of the invention, provided that no additive should be included that can negatively affect the performance of the layer into which it is incorporated or that can migrate into another layer and negatively affect the performance of that layer in carrying out its intended function. Suitable conventional additives include antioxidants, pigments, orientation stress modifiers, flame retardants, antistatic agents, antiblocking agents, antifoggants and slip agents.

Another class of additives that are permissible in the blend films, and which are frequently employed, are the hydrocarbon resins, which are frequently used as extrusion aids and orientation stress modifiers to reduce the energy required for orientation. The term "hydrocarbon resin" refers to a class of relatively low molecular weight, low softening point resins based on any of a number of hydrocarbon starting materials. Hydrocarbon resins include resins derived from terpenes, aliphatic or aromatic petroleum components and coal tar hydrocarbons.

Films according to the invention can be prepared by methods conventionally employed in the film making art. With specific reference to the multilayer films of the invention, there can be employed coextrusion, extrusion coating or lamination. The preferred method is coextrusion wherein the various layers are extruded simultaneously through a multi-layer die and immediately brought together in the molten state so that they are permanently bonded upon solidifying. As suggested hereinabove,an advantageous feature of the blends of polypropylene and ethylene-vinyl alcohol copolymer according to this invention is that they adhere to polypropylene in the coextrusion process without benefit of an intervening tie layer.

The films can be monoaxially or biaxially drawn to effect molecular orientation thereof and improve their properties, specifically, their tensile strength and their modulus (stiffness). Most commercially desirable films are biaxially oriented and that is preferred for the films of this invention. Film forming and drawing to effect orientation can be carried out by conventional techniques, i.e., either the tubular (bubble) process or the tenter process.

Self-supporting films prepared from polypropylene/ethylene-vinyl alcohol copolymer blends according to the invention can also be drawn to effect orientation thereof similarly to films of polypropylene, whereby the tensile strength and modulus (stiffness) are likewise significantly improved. The orientation can be either uniaxial or biaxial. For most applications, the films are biaxially oriented, usually about 5 or 6x. This is a surprising finding, inasmuch as the ethylene-vinyl alcohol copolymers per se are not normally biaxially orientable beyond about 2x. It is surprising to find that they can be oriented in the presence of polypropylene.

In either the multilayer embodiment of the film of the invention, or in the monolayer, stand-alone embodiment, the total thickness of the oriented film is typically in the range of about 0.25 to about 1.0 mil. A preferred film thickness is from about 0.5 to about 0.8 mil.

In the multilayer film embodiment, the thickness of the core layer is preferably about 0.23 to 0.9 mil and that of the blend film layer is about 0.01 to 0.15 mil. If a second functional layer is present, its thickness will likewise be about 0.01 to 0.15 mil.

The films of the invention are useful in most of the applications, such as packaging, in which polypropylene films are currently employed.

The films of the invention are characterized by a high resistance to the passage of oxygen therethrough as discussed above. This characteristic is of particular value in the use of the film for commercial packaging applications for such items as candy, snack foods and other food products that lose freshness rapidly when exposed to air and moisture vapor. In addition, these films are characterized by extremely good adhesion of other coatings thereto.

The films according to the invention are further characterized by outstanding resistance to the passage of helium therethrough. This characteristic makes them valuable in applications such as advertising balloons or other types of inflatable, lighter than air applications.

In view of the known characteristic of the ethylene-vinyl alcohol copolymer per se to exhibit a relatively low degree of resistance to the passage of moisture vapor, it is surprising to observe that the films of the invention exhibit a moisture vapor transmission rate (MVTR) that is not much, if any, greater than that of unmodified polypropylene. Thus, whereas the MVTR of unmodified polypropylene, measured by ASTMD-372 is typically about 0.3 gm/100 in$^2$/24 hours, that of the films of the invention is about 0.3–0.4 gm/100 in$^2$/24 hours.

Preparation of Blends of Polypropylene (PP) and Copolymer (COP)

Pellets of isotactic polypropylene and pellets of ethylene-vinyl alcohol copolymer were dry mixed and melt blended in a Leistritz twin screw extruder (American Leistritz Extruder Corporation, Somerville, N.J.). The blended polymer mass was extruded into a water bath at room temperature to quench it and was then chopped into pellets.

EXAMPLE 1

A series of blends of polypropylene (Montell PH384 from Montell, Inc. Wilmington, Del.) and ethylene-vinyl alcohol copolymer (EVAL-G from Evalca; 48 mole % ethylene) were prepared, melt blended and extruded as described in the previous paragraph. Processing conditions are recorded in Table 1.

TABLE 1

| COP/PP RATIO | EXTRUDER SPEED | MELT TEMPERATURE |
|---|---|---|
| 10/90 | 160 RPM | 245–247° C. |
| 20/80 | 160 RPM | 245–247° C. |
| 30/70 | 160 RPM | 245–247° C. |

Specimens of the blends in Table 1 were melt extruded using a Killion single screw extruder (Killion Extruders, Inc., Verona, N.J.) at about 253–254° C. onto a casting roll maintained at about 60° C. for quenching. Extrusion was carried out at about three FPM. A quenched cast film of about 23 mil thickness was recovered.

The cast film was then subjected to a 6x biaxial orienting draw on a T.M. Long stretcher (T.M. Long Corporation, Somerville, N.J.). Pertinent data and test results are recorded in Table 2.

TABLE 2

| COP/PP RATIO | DRAW TEMP | AVE. GAUGE | % HAZE[1] | OTR[2] |
|---|---|---|---|---|
| 10/90 | 140° C. | 64 | 15.2 | 13.9 |
| 10/90 | 145° C. | 63 | 11.8 | 9.8 |
| 10/90 | 150° C. | 64 | 8.3 | 10.1 |
| 10/90 | 155° C. | 55 | 2.2 | 6.4 |
| 20/80 | 150° C. | 61 | 15.O | 16.2 |
| 20/80 | 155° C. | 55 | 4.8 | 13.2 |
| 30/70 | 158° C. | 27 | 6.1 | 10.9 |

[1]Haze measured by ASTM D-1003
[2]Oxygen transmission rate according to ASTM D-3985-81

It is readily seen from Table 2 that, although properties of the films vary to some extent according to the processing conditions, the oxygen barrier properties are quite good in all cases. Likewise, the haze properties are also good in all cases.

EXAMPLE 2

Film preparation was carried out as described above in Example 1 except that in this example, the polypropylene employed was Aristech FF035C (Aristech Chemical Co., Pittsburgh, Pa.). The same ethylene-vinyl alcohol copolymer was employed.

The polypropylene and ethylene-vinyl alcohol copolymer were blended at 170 RPM at 245 to 247° C. Film was cast at about 260 to 263° C. and a speed of about 3.0 FPM onto a casting roll maintained at about 70° C. A cast film of about 23 mil thickness was recovered. The cast film was subjected to a 6x biaxially orienting draw with the T.M.Long stretcher.

Properties of the biaxially drawn film are recorded in Table 3.

TABLE 3

| COP/PP RATIO | TEMP.[1] | GAUGE | HAZE | MODULUS[2] | OTR |
|---|---|---|---|---|---|
| 10/90 | 140° C. | 85 | 19.5 | 295,000 | 26.5 |
| 10/90 | 150° C. | 78 | 6.4 | 281,000 | 18.2 |

TABLE 3-continued

| COP/PP RATIO | TEMP.[1] | GAUGE | HAZE | MODULUS[2] | OTR |
|---|---|---|---|---|---|
| 10/90 | 155° C. | 66 | 6.5 | 279,000 | 38.3 |
| 20/80 | 160° C. | 65 | 8.2 | 252,000 | 20.3 |

[1]Orientation temperature
[2]PSI by Instron Tensile Tester

EXAMPLE 3

Following substantially the procedures set forth in the previous examples, films were prepared using blends of the same ethylene-vinyl alcohol copolymer with a 85/15 mixture of polypropylene and a low molecular weight poly (dicyclopentadiene) resin. This polypropylene/hard resin mixture is a commercial product sold under the trade name Exxon HP3 by Exxon Chemical Co., Baytown,Tex.).

The polypropylene/hard resin/EVOH mixture was melt blended at about 255° C. and an extruder speed of 155 to 160 RPM. Films were cast at a temperature of about 273° C. and a rate of about 3.3 FPM. Films were quenched at about 50° C.

All films were drawn either 5× or 6× on the T.M. Long stretcher at 145° C. and heat set 10% at the same temperature. Pertinent test data are recorded in Table 4.

TABLE 4

| COP/PP RATIO | GAUGE | HAZE | MODULUS | OTR | MVTR |
|---|---|---|---|---|---|
| 0/100 | 76 | 0.96 | 502,000 | 74.9 | 0.22 |
| 10/90 | 75 | 12.6 | 429,000 | 9.6 | 0.29 |
| 15/85 | 73 | 25.3 | 421,000 | 5.0 | 0.33 |
| 20/80 | 116[1] | 62.0 | 381,000 | 3.7 | 0.26 |

1-After 5× draw

Other portions of the polymer blends having 10 and 15% ethylene-vinyl alcohol copolymer were then oriented at 150 and 155° C. to determine the effect of different orientation temperatures on the properties thereof. Data are recorded in Table 5.

TABLE 5

| COP/PP RATIO | TEMP. | GAUGE | HAZE | OTR | MVTR |
|---|---|---|---|---|---|
| 10/90 | 150 | 60 | 7.1 | 11.6 | 0.37 |
| 10/90 | 155 | 51 | 2.9 | 27.1 | 0.44 |
| 15/85 | 150 | 62 | 11.6 | 6.9 | 0.39 |
| 15/85 | 155 | 42 | 2.9 | 13.9 | 0.42 |

It is readily seen that the barrier properties of these films remain good as does the haze.

EXAMPLE 4

A three layer composite film was prepared and drawn 6× by the tubular (bubble) process. This film consisted of a 50 gauge core layer comprised of a substantially homogeneous blend of the polypropylene and the ethylene-vinyl alcohol copolymer used in Example 2, above. The blend contained about 5% by weight, based on total blend weight, of the ethylene-vinyl alcohol copolymer. A five gauge skin layer of a propylene—butene copolymer (8% by weight butene-1; MFR=17) was coextruded onto each surface of the core layer.

This film was found to have an oxygen transmission rate of 38 cm$^3$/100 in$^2$/atm/day.

EXAMPLE 5

Example 4 was repeated except that the ethylene-vinyl alcohol copolymer content was increased to 10%. The oxygen transmission rate of this film was found to be 14 cm$^3$/100 in$^2$/atm/day.

EXAMPLE 6

The procedures of Example 1 were followed except that the ethylene-vinyl alcohol copolymer had an ethylene content of 44 mole percent. The polypropylene was Aristech FF035C (Aristech Chemical Co., Pittsburgh, Pa.). Samples of varying ratios of polypropylene and EVOH were prepared. Films of 23 nil thickness were cast and biaxially drawn 6× on the T.M.Long stretcher. Property data for these films are recorded in Table 6.

TABLE 6

| COP/PP RATIO | TEMP.[1] | GAUGE | HAZE | OTR |
|---|---|---|---|---|
| 5/95 | 155° C. | 63 | 2.3 | 42 |
| 10/90 | 155° C. | 61 | 3.8 | 14 |
| 15/85 | 155° C. | 62 | 5.2 | 8.7 |

[1]Orientation temperature

EXAMPLE 7

The trilayer films prepared in Examples 4 and 5 were subjected to corona treatment on both of their surfaces. These films were aluminum coated to a thickness of about 135 Angstroms by vacuum deposition.

The metal coated films were tested for their OTR and also for their HeTR using techniques set forth in ASTM D3985-81 for OTR and ASTM D1434-66 Method V for HeTR.

The results of this testing are set forth in Table 7 below.

TABLE 7

| EVOH/PP RATIO | OTR (ml/100 in$^2$/day/atm) | HeTR (ml/100 in$^2$/day/atm) |
|---|---|---|
| 5/95 | 0.852 | 28 |
| 10/90 | 0.65 | 34 |

For corresponding metallized film without the ethylene-vinyl alcohol copolymer in the core, the OTR and HeTR values were 1.5 and 180 ml/100 in$^2$/day/atm, respectively. It is readily seen that additional improvements are realized in the OTR and the HeTR as a result of the metallization of the film of this invention.

What is claimed is:

1. An oriented film comprised of a substantially homogeneous blend consisting essentially of isotactic polypropylene and a copolymer of ethylene and vinyl alcohol, in a ratio of about 10/90 to 30/70 copolymer to polypropylene by weight, said copolymer being comprised of about 40 to 50 mole percent of the ethylene component and about 50 to 60 mole percent of the vinyl alcohol component.

2. An oriented composite film comprised of an isotactic polypropylene core, having, on one or both of its surfaces, as a barrier layer, a film comprised of a substantially homogeneous blend consisting essentially of isotactic polypropylene and a copolymer of ethylene and vinyl alcohol in a ratio of about 10/90 to 30/70 copolymer to polypropylene by weight, said copolymer being comprised of about 40 to 50 mole percent of the ethylene component and about 50 to 60 mole percent of the vinyl alcohol component, said barrier layer(s) having a thickness between about 0.01 and 0.25 mil.

3. A film according to claim 2 wherein the substantially homogeneous blend consists essentially of about 10 to 25% by weight, based on the total weight of the blend, of the copolymer of ethylene and vinyl alcohol.

4. A film according to claim 2 to which a metal coating has been applied.

5. An oriented film comprised of a core of a substantially homogeneous blend consisting essentially of isotactic polypropylene and a copolymer of ethylene and vinyl alcohol in a ratio of about 10/90 to 30/70 copolymer to polypropylene by weight, said copolymer being comprised of about 40 to 50 mole percent of the ethylene component and about 50 to 60 mole percent of the vinyl alcohol component, said oriented film having, on at least one of its surfaces, a thin functional layer having a thickness between about 0.01 and 0.25 mil.

6. A film according to claim 5 wherein the substantially homogenous blend consists essentially of about 10 to 25% by weight, based on the total weight of the blend, of the copolymer of ethylene and vinyl alcohol.

7. A film according to claim 5 wherein the functional layer is present on each surface and comprises a copolymer of propylene and butene-1.

8. A film according to claim 5 to which a metal coating has been applied.

9. An oriented film of a substantially homogeneous blend consisting essentially of isotactic polypropylene and a copolymer of ethylene and vinyl alcohol in a ratio of about 10/90 to 30/70 copolymer to polypropylene by weight, said copolymer being comprised of about 40 to 50 mole percent of the ethylene component and about 50 to 60 mole percent of the vinyl alcohol component and having a hard resin added to the blend.

10. A film according to claim 9 wherein the hard resin is a hydrocarbon resin.

* * * * *